(12) United States Patent
Seely et al.

(10) Patent No.: US 7,506,887 B2
(45) Date of Patent: Mar. 24, 2009

(54) GOOSENECK QUICKIE

(76) Inventors: John E. Seely, 895 C. R. 2480, Hico, TX (US) 76457; Tommy R. Thompson, 895 C. R. 2480, Hico, TX (US) 76457

( * ) Notice: Subject to any disclaimer, the term of this patent is extended or adjusted under 35 U.S.C. 154(b) by 522 days.

(21) Appl. No.: 11/331,298

(22) Filed: Jan. 13, 2006

(65) Prior Publication Data
US 2007/0175053 A1    Aug. 2, 2007

(51) Int. Cl.
*B60D 1/36* (2006.01)
(52) U.S. Cl. ............ 280/477; 33/264; 116/28 R; 280/441.2
(58) Field of Classification Search ............ 33/264; 116/28 R; 280/441.2, 447
See application file for complete search history.

(56) References Cited

U.S. PATENT DOCUMENTS 4,579,363 A * 4/1986 Allen et al. ............ 280/474
6,883,820 B2 * 4/2005 Freeman ............ 280/441.2

* cited by examiner

*Primary Examiner*—John Q. Nguyen
*Assistant Examiner*—Jacob Knutson
(74) *Attorney, Agent, or Firm*—James E. Walton

(57) ABSTRACT

A device to hasten the process of attaching a trailer, primarily a gooseneck variety, to a towing vehicle. The invention temporarily snaps on the towing ball of the vehicle and, when contacted with the trailer tongue, is activated and partially lowered. This action is observed by the vehicle driver and indicates a quick and sure position for attachment.

10 Claims, 2 Drawing Sheets

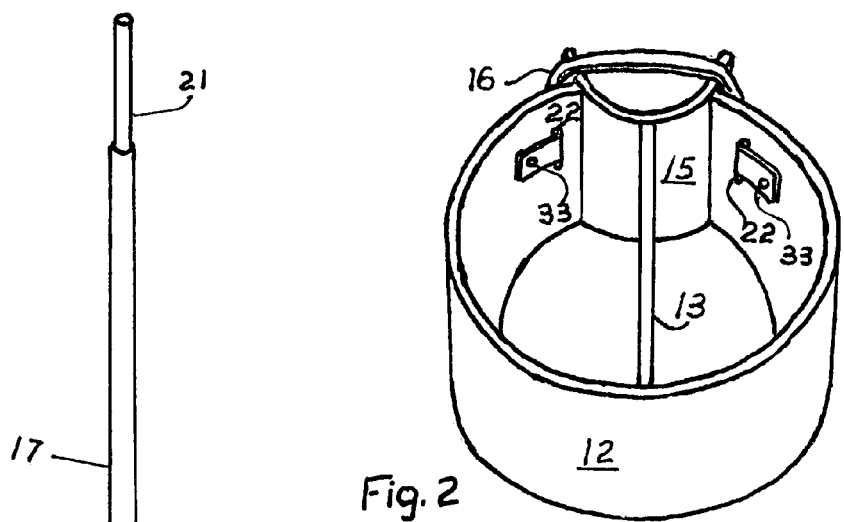
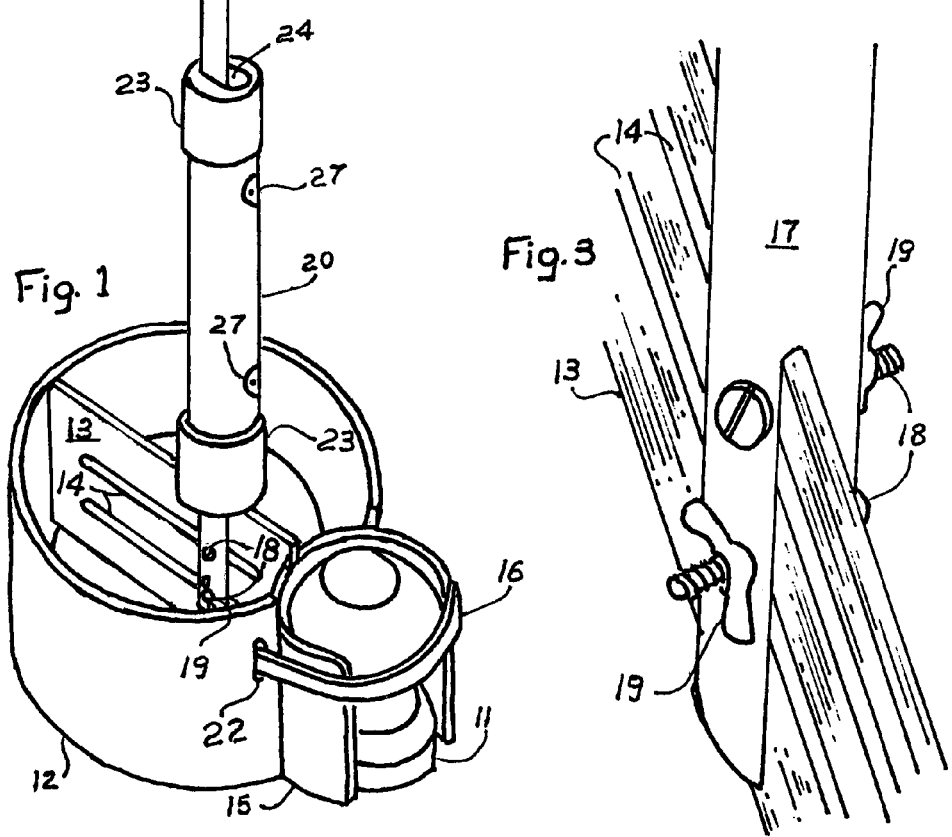
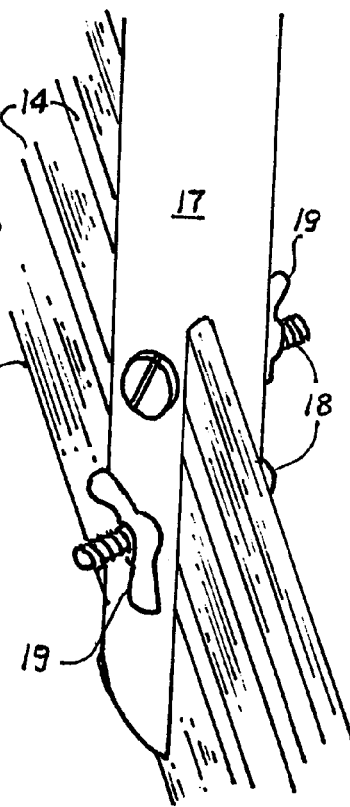

US 7,506,887 B2

GOOSENECK QUICKIE

CROSS-REFERENCE TO RELATED APPLICATIONS

"Not Applicable"

REFERENCE TO RELATED APPLICATIONS

"Not Applicable"

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF THE INVENTION

1. Field of the Invention

This invention relates to simplifying a problem associated with attaching a trailer to a vehicle.

2. Discussion of the Prior Art

The present invention involves attaching a gooseneck trailer to a vehicle. However, it can be applicable for some conventional trailer hookups as well. Gooseneck trailers have a towing tongue longer than conventional trailers. The attachment point on the tongue is bent down and connects to a towing ball. The ball is on a hauling bed, and centered over the rear axle, of a towing vehicle. The vehicle most commonly used is a farm type truck. The bend allows the towing tongue of a gooseneck trailer to swing past raised sides of a truck bed for necessary turns.

Many trucks designed to tow conventional trailers have a receiver hitch mechanism. This system extends out from the rear bumper, thus, it can be compatible to the present invention also.

To attach the trailer, the driver must back the truck and align the attaching point on the trailer tongue over the towing ball. This usually requires several attempts to accomplish because the driver often can't see the towing ball from his position in the truck. To simplify this task, the driver, when looking through the rear window, needs a devise to show the location of the towing ball in relation to the trailer tongue when the optimum point to hitch is reached.

Although other solutions have been presented, we believe, a simple, inexpensive method should be introduced as the following invention provides.

BRIEF SUMMARY OF THE INVENTION

The inventions primary components consist of a support body, with a vertical hollow pipe attached, a larger hollow pipe that is spring loaded and a solid rod. The support body snaps on a towing ball and has a flexible strip attached to secure the invention to the ball. The smaller hollow pipe stands vertically in front of the ball and has the solid rod inside, which extends above the vertical pipe. The larger diameter spring loaded pipe is shorter, slips over the vertical pipe and rests against the support body top.

When a trailer tongue is positioned to contact and push the spring loaded pipe mechanism, the rod inside the vertical pipe drops farther down. The rod is visible from the drivers position in a towing vehicle and, when it drops, signifies the trailer tongue is in position to lower. Then, the invention is removed to clear the ball for hitching.

BRIEF DESCRIPTION OF DRAWINGS

FIG. 1 is the invention positioned on a towing ball.

FIG. 2 shows the flexible strap attached inside the support body and pulled up to bypass a towing ball.

FIG. 3 is an upscale view of the vertical pipe, displayed in FIG. 1, fastened to the center plate of the support body using bolts and wing nuts.

DETAILED DESCRIPTION OF THE PREFERRED EMBODIMENT

Figure 4:
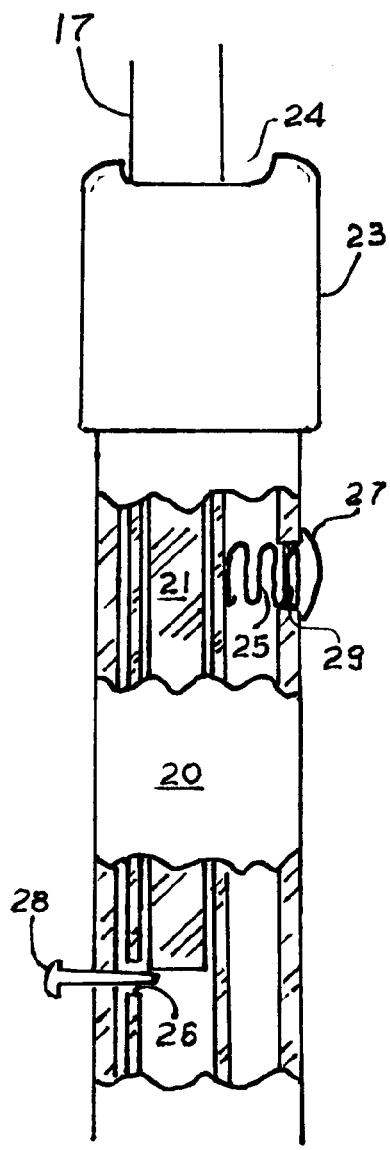
FIG. 4 is a detailed drawing of the spring loaded pipe assembly, as shown placed on the vertical pipe in FIG. 1 with cutaways to reveal the enter function.

FIG. 1 is a towing ball 11 with the support body 12 of the invention positioned on the ball 11. The support body 12 has a center plate 13 with two open slots 14. The rear portion of the support body 15 attaches to the ball 11 and, except for a cut opening, is compatible to the ball 11 diameter. The said opening is smaller, thus, creating a snap on coupling. A flexible strap 16 partially circles the ball 11 diameter at the opening in the front portion 15. This prevents the ball 11 separating from the support body 12 if excessive pressure is applied to activate the invention.

The vertical pipe 17 is attached to the center plate 13 with two machine bolts 18 and wing nuts 19. The spring loaded pipe assembly 20 is placed on the vertical pipe 17. The solid rod 21 is inside the vertical pipe 17 and extends above.

FIG. 2 is a reversed inside view of the support body 12 to illustrate the flexible strap 16. The strap 16 passes through two slots 22 in the support body 12 and extends over the front portion 15. This provides clearance to engage and disengage the invention from the towing ball 11. Two screws 33, one on each side, secures the strap 16 to the support body 12.

FIG. 3 is an upscale view of the center plate 13, of the support body 12, and FIG. 4 shows the vertical pipe 17 attached. Two bolts 18 are through holes in the vertical pipe 17 and slots 14 on the center plate 13. The wing-nuts 19 lock the vertical pipe 17, after it is adjusted to be compatible with the diameter of a trailer tongue. This adjustment positions the tongue over the towing ball 11 for proper alignment when the function of the invention is initiated.

FIG. 4 is a partial drawing of the spring loaded pipe assembly 20 and has a centerline cutaway to demonstrate how the components function inside. The top end cap 23 is typical and slotted 24 to allow back and forth movement over the vertical pipe 17. The spring 25 is typical and used to maintain pressure against the vertical pipe 17. The typical hole 29 provides positioning for the spring 25 and a typical self-locking hole plug 27 secures the spring 25 in position. A set screw 28 is screwed into the front side of the pipe assembly 20. The screw 28 passes through an open hole 26 in the vertical pipe 17 and is adjusted to position stop the solid rod 21 inside.

The objective of the invention, being to signal the desired position of a trailer tongue in reference to a towing ball 11, is met, when the tongue contacts and pushes the spring loaded pipe assembly 20. Pressure applied to the spring loaded area, on the pipe assembly 20, forces the set screw 28 to back out through the open hole 26 in the vertical pipe 17. Thus, the set screw 28 no longer supports the solid rod 21. The rod 21 drops from an extended height inside to a mere fingergrip position above the vertical pipe 17. Now, after the invention is removed, the trailer tongue is ready to be lowered and hitched to the towing ball 11.

Figure 5:
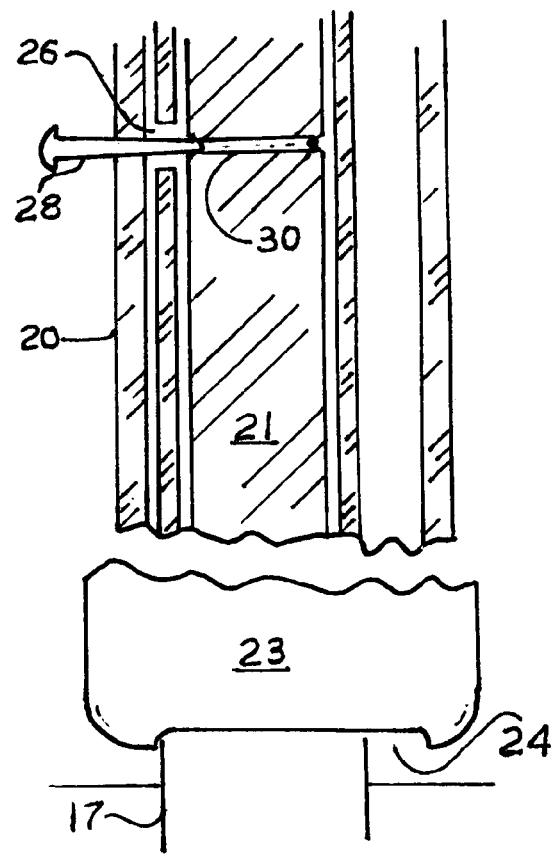
FIG. 5 shows an upscale view of the activated and lowered solid rod, as it stands, inside the vertical pipe. The set screw tip is in a groove to lock the rod inside if, or when, the invention is stored away.

FIG. 5 shows the solid rod 21 after it has dropped inside the vertical pipe 17. A groove 30 circles the rod 21. The set screw 28 fits in the groove 30 and, because of the initial pressure applied by the springs 25, the rod 21 is locked in place. This is convenient to insure all parts of the invention stay intact when removed from a ball 11 and stored away. The rod 21 is unlocked if minimal pressure is forced to the spring loaded pipe assembly.

Figure 6:
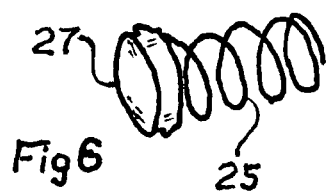
FIG. 6 shows one set of the two spring and hole plug assemblies, when detached from the spring loaded pipe.

FIG. 6 is a enhanced view of the typical spring 25 positioned inside the typical self-locking hole plug 27.

In accordance with the preferred embodiment of the invented device, PVC pipe is used to fabricate the two round portions of the support body 12. However, a plastic mold, with the foregoing center plate 13 included, is another means to create the support body 12. The center plate 13 is durable plastic and, in this case, Lexan polycarbonate. The preceding parts, as needed, are bonded together with Goop plumbers contact adhesive. The vertical pipe 17 and the spring loaded pipe body 20 are both fabricated from PVC pipe sections. In addition, the two end caps 23 are PVC fittings. The screws 28 and 33, nuts 19 and machine bolts 18 are standard grade, cadmium plated, fittings. Preferably, the compression springs 25 used are generated from 1 mm diameter metal stock and have a 6.84 lb. capacity rating. The springs 25 are secured in the holes 29 with either plastic or metal self-locking hole plugs 27. Molded rubber is the preferred material used for the flexible strap 16 that secures the invention to the towing ball 11; and, best suited, has the size and like consistency of E.P.D.M. strap material. In conclusion, the solid rod 21 is plastic material and is comparable to round molded electric fence stays.

Those skilled in the art will understand, from the foregoing, that the invention has been described with reference to its preferred embodiments and that substitutions or changes in materials or configuration may be made and still fit within the spirit and scope of the present invention, which is intended to be limited only by the accompanying claims.

The invention claimed is:

1. A trailer hitch alignment device, comprising:
 a support body having two substantially upright pipe sections of different diameters, the walls of the pipe sections being bonded together side by side, and having a substantially vertical plate bonded horizontally through the center of the upright pipe section with the larger diameter;
 a flexible strap fastened substantially horizontally across a cut-out wall section of the upright pipe section having the smaller diameter;
 a substantially vertical pipe attached to and extending up from the plate;
 a solid rod extending from inside the vertical pipe to above the vertical pipe;
 a spring loaded pipe disposed over the lower portion of the vertical pipe, the spring loaded pipe having an end cap located on an end thereof;
 a spring hole plug assembly disposed on each of the upper and lower portions of one side of the spring loaded pipe, each spring hole plug assembly having a spring with one end fixed to the spring loaded pipe and the other end pressing on the vertical pipe; and
 a set screw disposed on the spring loaded pipe opposite the spring hole plug assemblies to support the solid rod until a trailer hitch comes into contact with the spring loaded pipe, thereby compressing the springs, displacing the spring loaded pipe and the set screw, and allowing the solid rod to drop.

2. The trailer hitch alignment device according to claim 1, wherein the support body is formed from a plastic material.

3. The trailer hitch alignment device according to claim 1, wherein the support body is formed from a PVC material.

4. The trailer hitch alignment device according to claim 1, wherein the flexible strap is formed from a molded rubber material.

5. The trailer hitch alignment device according to claim 1, wherein the spring hole plug assembly formed from a plastic material.

6. A device for aligning a trailer hitch with a receiver ball, comprising:
 a support body configured to be releasably connected to the receiver ball;
 a generally upright pipe assembly adjustably attached to the support body;
 a rod operably associated with the upright pipe assembly and partially positioned within the upright pipe assembly, the rod being operable between an up position and a down position;
 a spring loaded pipe assembly disposed at least partially over the upright pipe assembly;
 at least one spring for biasing the spring loaded pipe assembly relative to the upright pipe assembly;
 a set screw coupled to the spring loaded pipe assembly, the set screw being positioned so as to support the rod in the up position when the spring loaded pipe assembly is biased relative to the upright pipe assembly;
 wherein the spring loaded pipe assembly and the set screw move relative to the upright pipe assembly upon contact of the trailer hitch with the spring loaded pipe assembly, thereby allowing the rod to move from the up position to the down position.

7. The device according to claim 6, wherein the support body is connected to the receiver ball by a releasable strap.

8. The device according to claim 6, wherein a lower end of the rod is disposed within the upright pipe assembly.

9. The device according to claim 6, wherein the upright pipe assembly is adjustably attached to the support body so as to allow adjustment of the horizontal distance between the receiver ball and the spring loaded pipe assembly.

10. The device according to claim 6, wherein the spring loaded pipe assembly is biased by the at least one spring toward the receiver ball.

* * * * *